US012422108B2

(12) United States Patent
Li et al.

(10) Patent No.: US 12,422,108 B2
(45) Date of Patent: Sep. 23, 2025

(54) LED FILAMENT AND LAMP

(71) Applicant: Long Yan De Yu Lighting Co., Ltd., Fujian (CN)

(72) Inventors: Yuanming Li, Fujian (CN); Dehua Huang, Fujian (CN); Xiaoqin Jian, Fujian (CN); Zhansheng Jian, Fujian (CN)

(73) Assignee: LONG YAN DE YU LIGHTING CO., LTD., Fujian (CN)

( * ) Notice: Subject to any disclaimer, the term of this patent is extended or adjusted under 35 U.S.C. 154(b) by 0 days.

(21) Appl. No.: 18/900,934

(22) Filed: Sep. 30, 2024

(65) Prior Publication Data

US 2025/0180174 A1 Jun. 5, 2025

(30) Foreign Application Priority Data

Dec. 5, 2023 (CN) ......................... 202323307035.3

(51) Int. Cl.
*F21K 9/238* (2016.01)
*F21V 23/00* (2015.01)
(Continued)

(52) U.S. Cl.
CPC ............ *F21K 9/238* (2016.08); *F21V 23/005* (2013.01); *F21V 23/06* (2013.01); *F21Y 2103/10* (2016.08);
(Continued)

(58) Field of Classification Search
CPC ........ F21K 9/238; F21K 9/232; F21V 23/005; F21V 23/06; F21Y 2103/10; F21Y 2113/00; F21Y 2115/10
See application file for complete search history.

(56) References Cited

U.S. PATENT DOCUMENTS

2016/0186933 A1* 6/2016 Su ........................... F21K 9/238
362/363
2023/0417377 A1* 12/2023 Ren ......................... F21K 9/237
2024/0093841 A1* 3/2024 Xiong ................... F21V 23/005

FOREIGN PATENT DOCUMENTS

CN 216480335 U * 5/2022
CN 217307918 U * 8/2022
CN 218064455 U * 12/2022

OTHER PUBLICATIONS

English translation of Zhou CN-218064455-U (Year: 2022).*
English translation of Wu CN-216480335-U (Year: 2022).*
English translation of Wu CN-217307918-U (Year: 2022).*

* cited by examiner

*Primary Examiner* — Evan P Dzierzynski
(74) *Attorney, Agent, or Firm* — Leong C. Lei

(57) ABSTRACT

An LED filament and a lamp are disclosed. The LED filament includes a substrate, a conductive circuit, a control chip, light-emitting chips, and electrical connection terminals. The conductive circuit includes an independent signal control circuit. The control chip is a bare-die chip, and has a VDD interface, a GND interface, an IN interface, an OUT interface, and LED control output ports. Two ends of the substrate have four electrical connection terminals electrically connected to the VDD interface, the GND interface, the IN interface and the OUT interface, respectively. Both ends of the first light-emitting chips are electrically connected to the LED control output ports and the VDD interface to form a light-emitting circuit. All components are integrated and packaged, small in size and easy to shape, so as to reduce production costs and diversify the shapes of lamps.

12 Claims, 3 Drawing Sheets

(51) Int. Cl.

| | |
|---|---|
| ***F21V 23/06*** | (2006.01) |
| *F21Y 103/10* | (2016.01) |
| *F21Y 113/00* | (2016.01) |
| *F21Y 115/10* | (2016.01) |

(52) U.S. Cl.

CPC ........ *F21Y 2113/00* (2013.01); *F21Y 2115/10* (2016.08)

LED FILAMENT AND LAMP

BACKGROUND OF THE INVENTION

1. Field of the Invention

The present invention relates to LED lighting devices, and more particularly to an LED filament and a lamp that can realize light color change and dynamic display.

2. Description of the Prior Art

With the development of LED technology, LED lighting fixtures have been widely used, and more requirements have been put forward for the diversification of light colors and displays. Especially in the application of ambient lighting, the lights need to achieve the functions of color change and dynamic display, such as color temperature change, phantom display, flashing, a news ticker and the like.

Conventional LED filaments generally have only two electrical connection terminals connected to the positive and negative terminals of the LED and the external power source.

They only provide power for the LED, but cannot achieve independent input and transmission of control signals, making it impossible to obtain functions such as color change and dynamic display. In addition, most conventional LED filaments use a packaged control chip. Due to the large size of the packaged control chip, it is necessary to increase the package thickness of the filament or to arrange the control chip independently.

Therefore, the conventional LED filament is large in size. When such an LED filament is used for producing a lamp, it is more difficult to realize the miniaturization of lamps and diversified shape design.

SUMMARY OF THE INVENTION

In view of the deficiencies of the conventional filament, the primary object of the present invention is to provide an LED filament and a lamp, having multiple light colors, phantom display, flashing, a news ticker and other functions.

In order to achieve the above object, the present invention adopts the following technical solutions:

According to one aspect of the present invention, an LED filament is provided. The LED filament comprises a substrate, a conductive circuit, a control chip, light-emitting chips, and electrical connection terminals. The conductive circuit, the control chip, the light-emitting chips and the electrical connection terminals are disposed on the substrate. The light-emitting chips includes first light-emitting chips. The control chip has a VDD interface, a GND interface, an IN interface, an OUT interface, and at least two LED control output ports.

Two ends of the substrate each have two of the electrical connection terminals. The electrical connection terminals are electrically connected to the VDD interface, the GND interface, the IN interface and the OUT interface of the control chip, respectively.

The substrate has at least two groups of the first light-emitting chips in different colors. The first light-emitting chips each have one end electrically connected to a corresponding one of the LED control output ports on the control chip and another end electrically connected to the VDD interface or the GND interface of the control chip to form a first light-emitting circuit.

Furthermore, the conductive circuit includes an independent signal control circuit. The IN interface and the OUT interface of the control chip are electrically connected to the signal control circuit.

Furthermore, the control chip is a bare-die control chip. This design allows the control chip and the light-emitting chips to be integrated and packaged on the substrate, thus realizing miniaturization.

Preferably, the substrate is a transparent substrate, and its material may be ceramic, sapphire, glass, transparent PCB, etc.

Preferably, the conductive circuit is a silver paste printed circuit to provide better conductivity and reduce the heat generation.

Furthermore, the light-emitting chips further include at least one group of second light-emitting chips. The second light-emitting chips each have two ends electrically connected to the VDD interface and the GND interface of the control chip to form a second light-emitting circuit. The second light-emitting circuit is connected in reverse parallel with the first light-emitting circuit. The design can realize the switching of different groups and colors of light-emitting circuits by simply switching the positive and negative terminals of the external power source, thereby simplifying the function of the control chip and reducing the cost.

In one embodiment, the light-emitting chips are bare-die light-emitting chips.

In one embodiment, the light-emitting chips are CSP (chip scale package) packaged or CHIP packaged light-emitting chips.

In one embodiment, the light-emitting chips are a combination of bare-die light-emitting chips and packaged light-emitting chips, and the packaged light-emitting chips are packaged by CSP packaging or CHIP packaging.

Furthermore, the substrate is covered with a dielectric layer. The dielectric layer is a transparent dielectric layer or a transparent dielectric layer containing diffusion powder. The conductive circuit, the control chip, the light-emitting chips are packaged within the dielectric layer to protect the substrate and components and to control the color of the light. Furthermore, a capacitor is provided on the substrate. Two ends of the capacitor are electrically connected to the VDD interface and the GND interface of the control chip, respectively. The capacitor is arranged in parallel with the control chip. The design can protect the control chip effectively and improve the stability of the control chip through the parallel connection of the capacitor and the control chip.

According to another aspect of the present invention, a lamp is provided. The lamp comprises at least one LED filament as described above.

After adopting the above solutions, the beneficial effects of the present invention are described below.

1. Through the electrical connection terminals at both ends of the substrate and the independent signal control circuit on the substrate, compared with the conventional filament, in addition to providing power input, the present invention has a separate signal control circuit. The control chip controls the current and switching status of the light-emitting chips to realize multiple light colors, phantom display, flashing, a news ticker and other functions.

2. The second light-emitting circuit is connected in reverse parallel with the first light-emitting circuit. By switching the positive and negative terminals of the input of the external power source, the light color can be switched. This not only maintains a variety of light colors but also reduces the manufacturing cost of the filament.

3. The control chip is a bare-die control chip, rather than a packaged control chip, such that the bare-die control chip is integrated and packaged on the substrate of the filament to be smaller in size, which is beneficial for the production of lamps with different forms, especially small-sized lamps.

4. The electrical connection terminals are disposed at both ends of the substrate, which can realize an automated butt weld process and the automatic production of the entire lamp, and reduce the production cost of the entire lamp.

BRIEF DESCRIPTION OF THE DRAWINGS

Other features, objects and advantages of the present invention will become more apparent through the detailed description of the embodiments with reference to the following accompanying drawings.

DETAILED DESCRIPTION OF THE PREFERRED EMBODIMENTS

Figure 1:
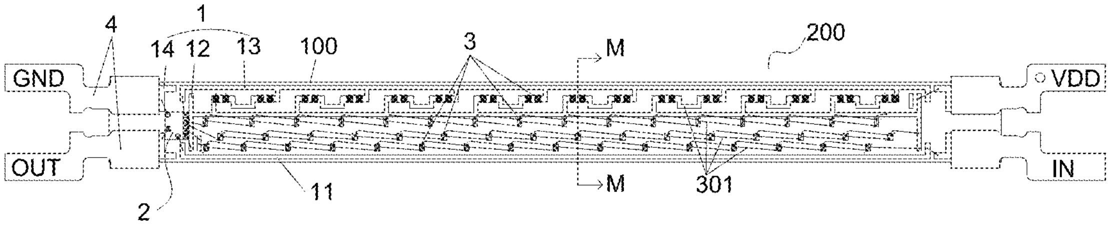
FIG. 1 is a structural schematic view according to a first embodiment of the present invention.

Embodiments of the present invention will now be described, by way of example only, with reference to the accompanying drawings.

First Embodiment

This embodiment provides an LED filament 200. The LED filament 200 comprises a substrate 100, a conductive circuit 1, a control chip 2, light-emitting chips 3, and electrical connection terminals 4. The conductive circuit 1, the control chip 2, the light-emitting chips 3 and the electrical connection terminals 4 are disposed on the substrate 100.

The substrate 100 is a transparent substrate, and its material may be ceramic, sapphire, glass, transparent PCB, etc. The conductive circuit 1 is a silver paste circuit printed on the substrate 100 to provide better conductivity and reduce the heat generation. The conductive circuit 1 includes a signal control circuit 11, an anode circuit 12, a cathode circuit 13, and four end circuits 14 that are not conductive with each other.

Figure 2:
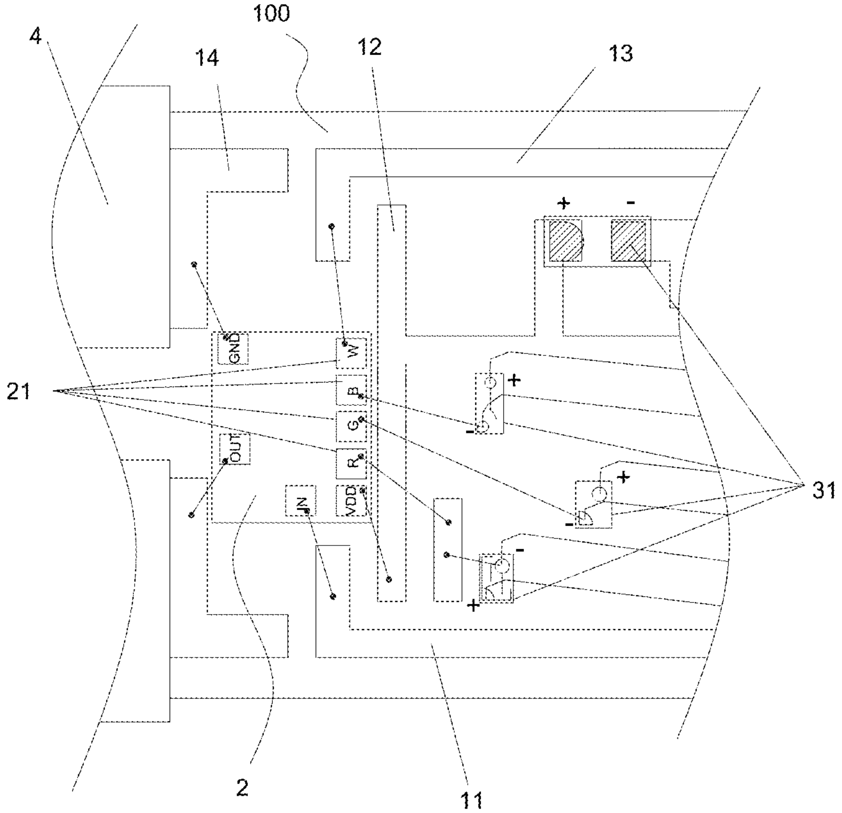
FIG. 2 is a partial structural schematic view according to the first embodiment of the present invention.

As shown in FIG. 1 and FIG. 2, the control chip 2 is a bare-die control chip directly arranged on the substrate 100. The control chip 2 has a VDD interface, a GND interface, an IN interface, an OUT interface, and at least two LED control output ports 21. As shown in FIG. 2, the LED control output ports 21 include an R output port, a G output port, a B output port, and a W output port. The IN interface and the OUT interface of the control chip 2 are electrically connected to the signal control circuit 11. The VDD interface of the control chip 2 is electrically connected to the anode circuit 12.

Two ends of the substrate 100 each have two of the electrical connection terminals 4. The electrical connection terminals 4 include a VDD terminal, a GND terminal, an IN terminal, and an OUT terminal. Each electrical connection terminal 4 is connected to a corresponding one of the end circuits 14. The electrical connection terminals 4 are electrically connected to the VDD interface, the GND interface, the IN interface and the OUT interface through the respective end circuits 14. As shown in FIG. 1, the electrical connection terminals 4 are defined as the VDD terminal, the GND terminal, the IN terminal and the OUT terminal according to the connected interfaces, respectively. The VDD terminal and the IN terminal are disposed on one end of the substrate 100. The OUT terminal and the GND terminal are disposed on the other end of the substrate 100.

The substrate 100 is equipped with the light-emitting chips 3 in four colors: red, green, blue, and white (R, G, B and W). The light-emitting chips 3 are light-emitting diode components, which may be bare-die light-emitting chips, CSP (chip scale package) packaged light-emitting chips or CHIP packaged light-emitting chips, or a combination thereof. The light-emitting chips 3 include first light-emitting chips 31. As shown in FIG. 1, the R, G, B light-emitting chips are bare-die light-emitting chips and are connected in series and parallel through leads. The W light-emitting chips are CSP packaged light-emitting chips and are connected in series and parallel through the conductive circuit 1 printed on the substrate 100. One end of the first light-emitting chip 31 is electrically connected to the LED control output port 21 in the corresponding color on the control chip 2, and the other end of the first light-emitting chip 31 is electrically connected to the VDD interface or the GND interface of the control chip 2 to form a first light-emitting circuit 301. As shown in FIG. 1 and FIG. 2, after the R, G, B light-emitting chips are connected in series and parallel, the negative terminals are electrically connected to the R output port, the G output port, and the B output port on the control chip 2, respectively, and the positive terminals are electrically connected to the VDD interface through the anode circuit 12 to form independent R, G, and B light-emitting circuits. The negative terminal of the W light-emitting chip is electrically connected to the W output port through the cathode circuit 13, and the positive terminal of the W light-emitting chip is electrically connected to the VDD interface through the anode circuit 12 to form a W light-emitting circuit. The R, G, B, W light-emitting circuits are all the first light-emitting circuit 301.

Figure 3:
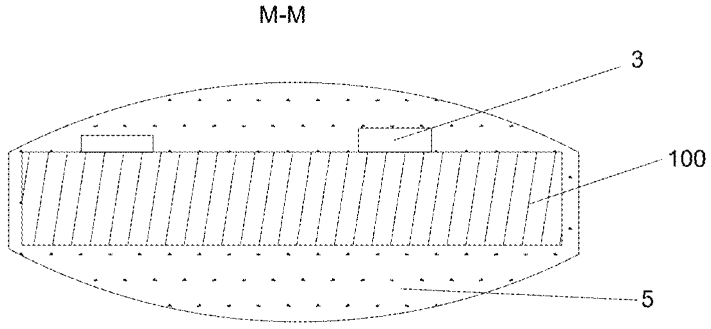
FIG. 3 is a structural schematic view taken along line M-M of FIG. 1.

During packaging, the control chip 2, the conductive circuit 1, the light-emitting chips 3 and the substrate 100 are integrally packaged within a dielectric layer 5 to form a small-sized filament. The dielectric layer 5 may be a transparent dielectric layer or a transparent dielectric layer containing diffusion powder. As shown in FIG. 3, the dielectric layer 5 is a transparent dielectric layer containing diffusion powder.

Second Embodiment

Figure 4:
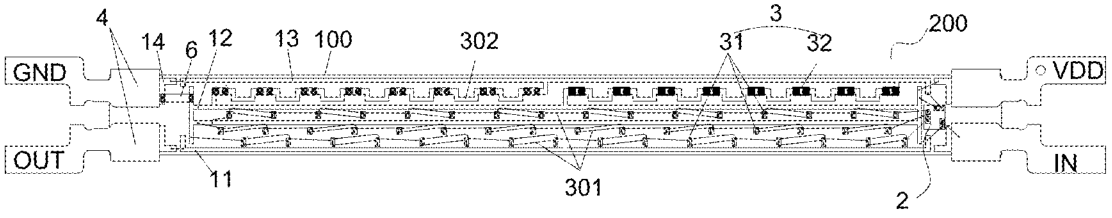
FIG. 4 is a structural schematic view according to a second embodiment of the present invention.
Figure 5:
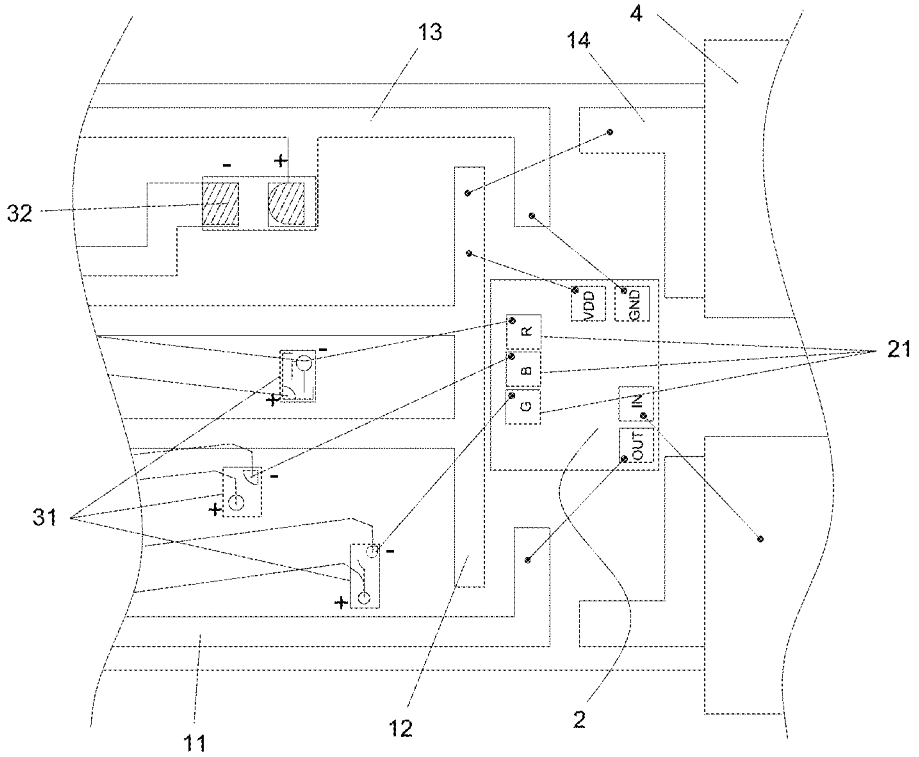
FIG. 5 is a first partial structural schematic view according to the second embodiment of the present invention.

As shown in FIG. 4 and FIG. 5, this embodiment provides another LED filament 200.

Based on the first embodiment, the R, G, B, W light-emitting chips 3 are divided into first light-emitting chips 31 and second light-emitting chips 32. As shown in FIG. 4, same as the first embodiment, after the R, G, B light-emitting chips are connected in series and parallel, the positive terminals are electrically connected to the VDD interface, and the negative terminals are electrically connected to the R output port, the G output port, and the B output port on the control chip 2, respectively, to form the first light-emitting circuits. The W light-emitting chips are defined as the second light-emitting chips 32. After the W light-emitting chips are connected in series and parallel, the negative terminals are connected to the VDD interface through the anode circuit 12, and the positive terminals are connected to the GND interface through the cathode circuit 13 to form a second light-emitting circuit 302. The first light-emitting circuit 301 and the second light-emitting circuit 302 form a reverse parallel connection, that is, the positive and negative terminals of the second light-emitting circuit 302 and the first light-emitting circuit 301 are arranged in opposite directions. When the external power source is input in the forward direction, the first light-emitting circuit 301 works; when the external power source is input in the reverse direction, the second light-emitting circuit 301 works. In this way, the color change of the LED filament 200 can be realized quickly.

Figure 6:
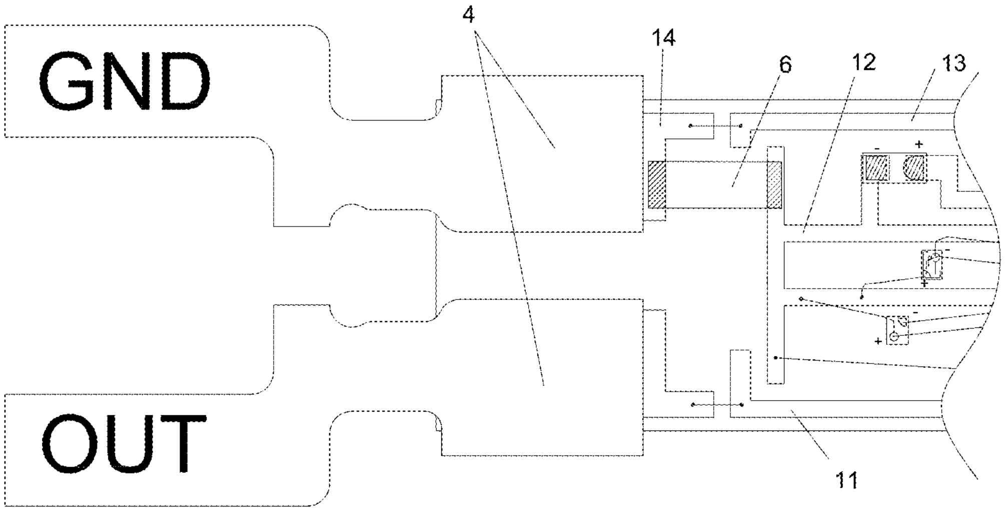
FIG. 6 is a second partial structural schematic view according to the second embodiment of the present invention.

Further, a capacitor 6 is provided on the substrate 100. The capacitor 6 is a surface-mounted capacitor. Both ends of the capacitor 6 are electrically connected to the VDD interface and the GND interface, respectively. The capacitor 6 is arranged in parallel with the control chip 2. In the actual product, the capacitor 6 is secured on the substrate 100. One end of the capacitor 6 is electrically connected to the VDD interface of the control chip 2, and the other end of the capacitor 6 is electrically connected to the GND interface of the control chip 2. The capacitor 6 is electrically connected to the VDD interface and the GND interface through leads, alternatively, the capacitor 6 is attached to the conductive circuit 1 of the substrate 100 and is electrically connected to the VDD interface and the GND interface through the conductive circuit 1. As shown in FIG. 6, one end of the capacitor 6 is attached to the anode circuit 12 and is electrically connected to the VDD interface through the anode circuit 12, and the other end of the capacitor 6 is attached to the end circuit 14 connected to the GND terminal and is electrically connected to the GND interface through the end circuit 14 and the cathode circuit 13.

The advantage of the second embodiment compared to the first embodiment is that it uses a cost-effective three-way control chip 2. The light colors can be directly switched by simply switching the positive and negative terminals of the input of the external power source, having a variety of light colors and reducing the manufacturing cost of the filament. Through the capacitor 6 connected in parallel with the VDD interface and the GND interface at both ends of the control chip 2, the control chip 2 is protected and the stability of the operation of the control chip 2 is improved.

The other components, their connection relationship and positional relationship and the like in the second embodiment are the same as those in the first embodiment.

Third Embodiment

Figure 7:
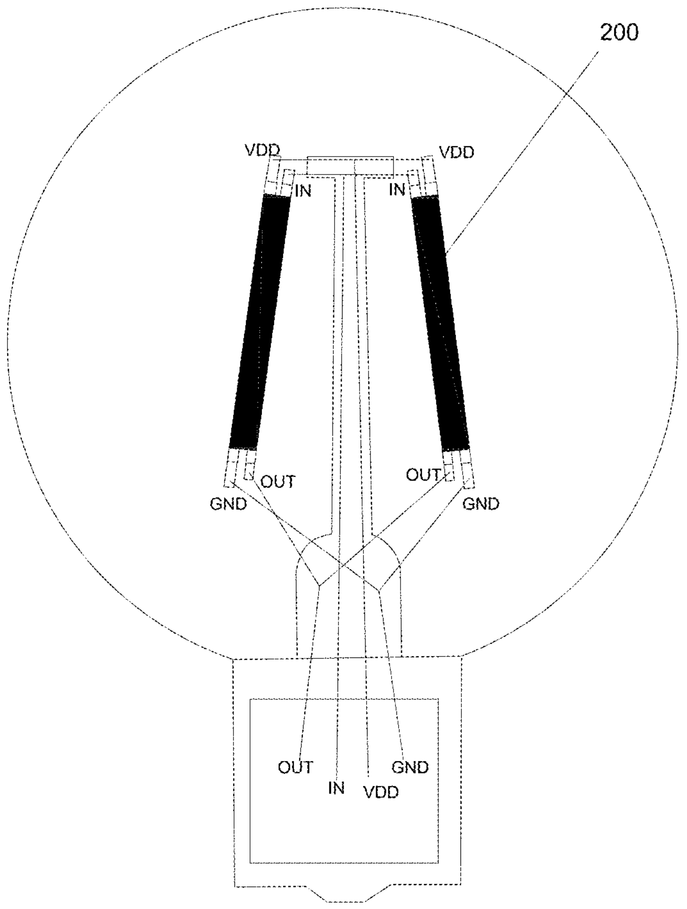
FIG. 7 is a structural schematic view of a lamp of the present invention.

The present invention further provides a lamp. The lamp includes the LED filament 200 in the first embodiment or the second embodiment. The LED filament 200 may be one or more, and the connection may be series connection, parallel connection or a combination of series and parallel connection. As shown in FIG. 7, the lamp includes four LED filaments 200. The LED filaments 200 are mounted in parallel in a spherical bulb to form the lamp.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. An LED (light-emitting diode) filament, comprising a substrate, a conductive circuit, a control chip, light-emitting chips and electrical connection terminals, the conductive circuit, the control chip, the light-emitting chips and the electrical connection terminals being disposed on the substrate, the light-emitting chips including first light-emitting chips;

the control chip having a VDD interface, a GND interface, an IN interface, an OUT interface and at least two LED control output ports;

two ends of the substrate each having two of the electrical connection terminals, the electrical connection terminals being electrically connected to the VDD interface, the GND interface, the IN interface and the OUT interface of the control chip, respectively;

the substrate having at least two groups of the first light-emitting chips in different colors, the first light-emitting chips each having one end electrically connected to a corresponding one of the LED control output ports on the control chip and another end electrically connected to the VDD interface or the GND interface of the control chip to form a first light-emitting circuit.

2. The LED filament as claimed in claim 1, wherein the conductive circuit includes an independent signal control circuit, and the IN interface and the OUT interface of the control chip are electrically connected to the signal control circuit.

3. The LED filament as claimed in claim 1, wherein the control chip is a bare-die control chip.

4. The LED filament as claimed in claim 1, wherein the substrate is a transparent substrate.

5. The LED filament as claimed in claim 1, wherein the conductive circuit is a silver paste printed circuit.

6. The LED filament as claimed in claim 1, wherein the light-emitting chips further include at least one group of second light-emitting chips, and the second light-emitting chips each have two ends electrically connected to the VDD interface and the GND interface of the control chip to form a second light-emitting circuit.

7. The LED filament as claimed in claim 1, wherein the light-emitting chips are bare-die light-emitting chips.

8. The LED filament as claimed in claim 1, wherein the light-emitting chips are CSP (chip scale package) packaged or CHIP packaged light-emitting chips.

9. The LED filament as claimed in claim 1, wherein the light-emitting chips are a combination of bare-die light-emitting chips and packaged light-emitting chips.

10. The LED filament as claimed in claim 1, wherein the substrate is covered with a dielectric layer, the dielectric layer is a transparent dielectric layer or a transparent dielectric layer containing diffusion powder, and the conductive circuit, the control chip, the light-emitting chips are packaged within the dielectric layer.

11. The LED filament as claimed in claim 1, wherein a capacitor is provided on the substrate, two ends of the capacitor are electrically connected to the VDD interface and the GND interface of the control chip respectively, and the capacitor is arranged in parallel with the control chip.

12. A lamp, comprising at least one LED filament as claimed in claim 1.

* * * * *